United States Patent Office  2,910,479
Patented Oct. 27, 1959

2,910,479

CERTAIN 4-PYRIDYL THIAZOLINE-2-ONES AND PROCESS

George de Stevens, New Providence, N.J., assignor to Ciba Pharmaceutical Products, Inc., Summit, N.J., a corporation of New Jersey No Drawing. Application January 6, 1958
Serial No. 707,142

12 Claims. (Cl. 260—294.8)

This invention relates to a new series of 4-thiazoline-2-one compounds. More particularly the invention concerns 3-$R_1$-4-pyridyl-5-$R_2$-4-thiazoline-2-one compounds, in which each of the radicals $R_1$ and $R_2$ stands for hydrogen or lower hydrocarbon, salts and quaternary ammonium compounds.

Apart from hydrogen the radical $R_1$ stands more especially for a lower alkyl radical having from 1 to 7 carbon atoms, e.g. methyl, ethyl, propyl, isopropyl or butyl. Such radicals may contain additional substituents such as amino groups, e.g. dimethylamino, diethylamino, pyrrolidino, piperidino, morpholino, or piperazino groups; hydroxyl groups; acyloxy groups, e.g. acetoxy; or alkoxy groups, e.g. methoxy or ethoxy.

The pyridyl substituent in the 4-position of the 4-thiazoline-2-one may be a 2-pyridyl, a 3-pyridyl or a 4-pyridyl radical, and may contain additional substituents, such as lower alkyl, e.g. methyl or ethyl.

The 4-thiazoline-2-one ring is preferably unsubstituted in the 5-position or may contain a lower hydrocarbon radical as a substituent, such as a lower alkyl radical, e.g. methyl, ethyl, propyl, isopropyl or butyl; an aryl radical, e.g. phenyl or naphthyl; or an aralkyl radical, e.g. benzyl; such a radical may contain additional substituents, such as amino, e.g. dimethylamino; hydroxyl; acyloxy, e.g. acetoxy; alkoxy, e.g. methoxy or ethoxy; or halogen, e.g. chlorine or bromine.

Salts of the new 4-thiazoline-2-one compounds are particularly therapeutically useful acid addition salts, such as those with inorganic acids, such as hydrohalic acids, e.g. hydrochloric or hydrobromic acid; perchloric, nitric or thiocyanic acid; or sulfuric or phosphoric acids; or those with organic acids, such as formic, acetic, propionic, glycolic, lactic, pyruvic, oxalic, malonic, succinic, maleic, fumaric, malic, tartaric, citric, ascorbic hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

Quaternary ammonium compounds are particularly those with esters formed by hydroxylated hydrocarbons and strong inorganic or organic acids. Such esters are especially lower alkyl halides, e.g. methyl chloride, methyl bromide, methyl iodide, ethyl chloride, ethyl bromide, ethyl iodide and propyl chloride; di-lower alkyl sulfates, e.g. dimethyl sulfate or diethyl sulfate; or lower alkyl arylsulfonates, e.g. methyl p-toluene-sulfonate.

The new series of 3-$R_1$-4-pyridyl-5-$R_2$-4-thiazoline-2-ones and the salts thereof show analgesic properties and are used to alleviate pain. The new compounds may be used as medicaments in the form of pharmaceutical preparations, which contain the new compounds or salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form, for example, as tablets, dragees or capsules or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

A convenient method to prepare the new compounds comprises treating a pyridyl α-halogeno-$R_2$-methyl ketone, in which $R_2$ has the above given meaning, or a salt thereof with an N-$R_1$-thiocarbamic acid, in which $R_1$ has the given meaning, or a salt or an ester thereof, and, if desired, replacing in any resulting 4-thiazoline-2-one, unsubstituted in the 3-position, the hydrogen atom attached to the ring nitrogen atom by a lower hydrocarbon radical, and/or, if desired converting any resulting salt into the free base, and/or, if desired, converting a resulting free base into a salt or a quaternary ammonium compound thereof.

A pyridyl α-halogeno-$R_2$-methyl ketone is preferably used in the form of a salt thereof, particularly, a hydrohalide, e.g. hydrochloride or hydrobromide, thereof. The halogen atom, substituting the methyl radical of the pyridyl methyl ketone, stands for a chlorine or iodine or particularly for a bromine atom. The preferred ketones are the hydrobromides of pyridyl α-bromo-$R_2$-methyl ketones, in which the methyl group may contain a further substituent.

The N-$R_1$-thiocarbamic acids used as a starting material in the preparation of the new thiazoline-2-one compounds, are preferably used in the form of their lower alkyl, e.g. methyl, ethyl or propyl, esters. As salts the ammonium salt or an alkali metal, e.g. sodium of potassium, salt of an N-$R_1$-thiocarbamic acid may be employed.

The condensation reaction may be performed in the absence or presence of a solvent, at room temperature or at an elevated temperature, at atmospheric or at an elevated pressure, and, if desired, under the atmosphere of an inert gas, such as nitrogen. If the pyridyl α-halogeno-$R_2$-methyl ketone is used as a salt, such as a hydrohalide, the reaction is carried out in the presence of a hydroxylated solvent, such as a lower alkanol, e.g. methanol, ethanol, propanol, isopropanol or butanol, or in water or in an aqueous solution of a lower alkanol. Though the reaction proceeds at room temperature, it is accelerated and more readily completed, when carried out at an elevated temperature, for example, at the boiling temperature of the solvent.

In an resulting 4-thiazoline-2-one, unsubstituted in the 3-position, the hydrogen atom attached to the ring nitrogen atom may be replaced by a lower hydrocarbon radical. Such replacement may be performed by treating the resulting thiazoline-2-one with a reactive ester formed by a hydroxylated lower hydrocarbon and a strong inorganic or organic acid, such as for example, the reactive esters used for the preparation of the quaternary ammonium compounds. To avoid quaternization, the 4-thiazoline-2-one compound is converted into a salt thereof, such as an alkali metal salt, e.g. lithium, sodium or potassium salt, and such salt is then reacted with the reactive ester. The metal salts may be prepared by reacting the 4-thiazoline-2-ones with the alkali metal, e.g. sodium or potassium, in an inert solvent such as a hydrocarbon, e.g. benzene, toluene or xylene; with an alkali metal lower alkanolate, e.g. sodium methylate or potassium ethylate, in a lower alkanol, e.g. methanol or ethanol; or with an alkali metal hydride or amide, e.g. lithium, sodium or potassium hydride or amide in an inert solvent, e.g. benzene, toluene, xylene or p-dioxane.

The starting materials, i.e. the pyridyl α-halogeno-R₂-methyl ketones or the salts thereof, such as the hydrobromide of a pyridyl α-bromomethyl ketone, and the reactive N-R₁-thiocarbamic acid derivatives, e.g. the lower alkyl N-R₁-thiocarbamates, are known or may be prepared according to procedures used for the manufacture of the known compounds.

Depending on the conditions used the new compounds may be obtained as the free bases or salts thereof. A salt may be converted into the free base in the customary way, e.g. by reaction with an alkali metal hydroxide, such as sodium or potassium hydroxide, or with aqueous ammonia. A free base may be transformed into its therapeutically useful acid addition salt by reaction with an appropriate inorganic or organic acid, such as one of the acids outlined above, for example, in an alcohol, e.g. methanol or ethanol, or an ether, e.g. diethylether solution, or in a mixture of such solvents.

The new 4-thiazoline-2-one derivatives of this invention may be converted into the quaternary ammonium compounds thereof by reacting a resulting base with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid. Such esters are specifically lower alkyl halides, e.g. methyliodide, methylbromide, methylchloride, ethylbromide or propylchloride; di-lower alkylsulfates, e.g. dimethyl or diethyl sulfate; or lower alkyl aryl sulfonates, e.g. methyl p-toluene sulfonate. The quaternizing reactions are performed in the presence or absence of a solvent, at room temperature or under cooling, at atmospheric pressure or in a closed vessel under pressure. Suitable solvents are more especially lower alkanols, e.g. methanol, ethanol, propanol, isopropanol, butanol or pentanol; or organic acid amides, e.g. formamide or dimethylformamide.

Quaternary ammonium compounds obtained may be converted into the corresponding quaternary ammonium hydroxides, for example, by reaction of the quaternary ammonium halides obtained with silver oxide, or by reaction of the corresponding sulfates with barium hydroxide or by treating the quaternary ammonium salts with an anion exchanger or by electrodialysis. From the resulting base there may be formed therapeutically suitable quaternary ammonium salts by reaction with an acid, for example, with one of the inorganic or organic acids outlined hereinbefore for the preparation of the acid addition salts, or with a mono-lower alkyl sulfate such as methyl or ethyl sulfate. A quaternary ammonium compound obtained may also be converted into another quaternary ammonium salt directly without conversion into the quaternary ammonium hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The invention also comprises any modification of the general process wherein a compound obtainable as an intermediate at any stage of the process is used as starting material and the remaining step(s) of the process is (are) carried out, as well as any new intermediates.

The following examples illustrate the invention. They are not to be construed as being limitations thereon. Temperatures are given in degrees centigrade.

Example 1

A mixture of 5.62 g. of 2-bromoacetyl-pyridine hydrobromide and 2.52 g. of ethyl thiocarbamate in 10 ml. of ethanol is refluxed for 2 hours and kept under refrigeration overnight. 3.28 g. of 4-(2-pyridyl)-4-thiazoline-2-one hydrobromide is collected and recrystallized from methanol, M.P. 266–268°.

Example 2

A mixture of 5.62 g. of 2-bromoacetyl-pyridine hydrobromide and 2.85 g. of ethyl N-methyl-thiocarbamate in 50 ml. of ethanol yields 4.92 g. of 3-methyl-4-(2-pyridyl)-4-thiazoline-2-one hydrobromide when reacted according to the procedure given in Example 1. After recrystallization from methanol, the product melts at 242–245°.

The 3-methyl-4-(2-pyridyl)-4-thiazoline-2-one may also be prepared by reacting a toluene solution of 4-(2-pyridyl)-4-thiazoline-2-one, obtained from the hydrobromide described in Example 1 by treatment with aqueous ammonia and subsequent ether extraction, with sodium hydride and then with a stoichiometric amount of methyl iodide.

Example 3

3.14 g. of 4-(4-pyridyl)-4-thiazoline-2-one hydrobromide, M.P. 248–249° after recrystallization from methanol, is obtained by reacting 4.5 g. of 4-bromoacetyl-pyridine hydrobromide and 1.58 g. of ethyl thiocarbamate in 50 ml. of ethanol according to the procedure described in Example 1.

Example 4

A mixture of 4.5 g. of 4-bromoacetyl-pyridine hydrobromide and 1.8 g. of ethyl N-methyl-thiocarbamate in 30 ml. of ethanol yields 3.3 g. of 3-methyl-4-(4-pyridyl)-4-thiazoline-2-one hydrobromide, when reacted according to the procedure given in Example 1; the product melts at 225–228° after recrystallization from methanol.

The hydrobromide salt is converted to the base by treatment with aqueous ammonia and extraction with ether. A concentrated ether solution yields the tartrate of 3-methyl-4-(4-pyridyl) - 4 - thiazoline - 2 - one, when treated with a solution of tartaric acid in isopropanol.

Example 5

A mixture of 5.62 g. of 3-bromoacetyl-pyridine hydrobromide and 2.52 g. of ethyl thiocarbamate in 10 ml. of ethanol is reacted according to the procedure given in Example 1 and yields 5.2 g. of 4-(3-pyridyl)-4-thiazoline-2-one hydrobromide, M.P. 276–278° after recrystallization from methanol.

Example 6

A solution of 5.62 g. of 3-bromoacetyl-pyridine hydrobromide and 2.85 g. of ethyl N-methyl-thiocarbamate in 10 ml. of ethanol is refluxed for 1 hour, kept at room temperature overnight and then evaporated to dryness. After trituration with acetone 5 g. of crystalline 3-methyl-4-(3-pyridyl)-4-thiazoline-2-one hydrobromide is collected, which after recrystallization from methanol melts at 230–233°.

Example 7

Treatment of 3-(α-bromo-propionyl)-pyridine hydrobromide with propyl thiocarbamate according to the procedure given in Example 1 yields the 4-(3-pyridyl)-5-methyl-4-thiazoline-2-one.

Example 8

The 4-(6-methyl-3-pyridyl)-4-thiazoline-2-one may be prepared by reacting 3-bromoacetyl-6-methyl-pyridine hydrobromide with ethyl thiocarbamate according to the procedure given in Example 1.

From a broad point of view the invention comprises the preparation of the new compounds of the formula:

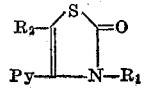

in which each of the radicals $R_1$ and $R_2$ stands for hydrogen or a lower hydrocarbon, and Py for a pyridyl radical, salts or quaternary ammonium compounds, by the general method of reacting together compounds of the formulae:

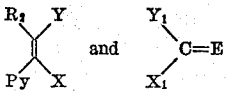

as well as the tautomeric forms and/or salts thereof, wherein $R_2$ and Py have the above given meaning, and wherein X and $X_1$ are substituents reacting together with the formation of the group:

$R_1$ having the above given meaning, Y and $Y_1$ are substituents reacting together with the formation of the group —S—, and wherein E represents an oxo group or an etherified hydroxyl group, and, if desired, replacing in a resulting 4-thiazoline-2-one, unsubstituted in the 3-position, the hydrogen atom attached to the ring nitrogen atom by a lower hydrocarbon radical, and/or, if desired, converting any resulting salt into the free base, and/or, if desired converting a resulting free base into a salt or a quaternary ammonium compound thereof. X, $X_1$, Y and $Y_1$ may appropriately be selected according to general chemical knowledge from the group of substituents consisting of free or reactive esterified or etherified hydroxyl groups, free or etherified mercapto groups or free or mono-lower hydrocarbon substituted amino groups. Esterified hydroxyl groups are especially hydroxyl groups esterified with strong inorganic acids, such as hydrohalic acids, e.g. hydrochloric or hydrobromic acid, or strong organic acids, such as organic sulfonic acids, e.g. p-toluene sulfonic acid. As etherified hydroxyl groups there may be mentioned especially lower alkoxy groups, which may also be part of a carbalkoxy group. An etherified hydroxyl group such as the one represented by the radical E is a lower hydrocarbon-oxy group, more especially a lower alkoxy group, e.g. methoxy, ethoxy, propoxy, isopropoxy or butoxy group. Etherified mercapto groups are preferably lower alkyl mercapto groups. In these compounds hydrogen atoms being part of the substituents X, $X_1$, Y and $Y_1$ may give rise to tautomerism by shifting and thus accommodating the double bonds in the above formulae, provided that the reactivity of the compounds used for the desired purpose is not affected. This condensation reaction is carried out in the usual manner, if necessary, in the presence of condensing agents, e.g. alcoholates, amides or hydrides of alkali metals.

A further method to prepare the new compounds consists in converting in a compound of the formula:

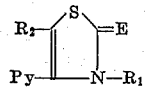

as well as the tautomeric forms and/or salts thereof, wherein $R_1$, $R_2$ and Py have the above given meaning, and wherein E is a radical convertible into an oxo or hydroxy group respectively, E into such a group, and, if desired, carrying out the optional steps. E may be, for example, an esterified or etherified hydroxyl group, e.g. a lower alkoxy group or a halogen atom, or a methylene group. Esterified or etherified hydroxy groups are hydrolyzed in the usual manner, e.g. by treatment with alkali or strong acids respectively. If the esterified hydroxyl group is a halogen atom, e.g. chlorine, it can be converted directly into the hydroxyl group by treatment with metal hydroxides, for example, silver hydroxide or may be first converted into an etherified hydroxyl group such as a lower alkoxy group by treatment with a metal lower alcoholate, such as sodium methylate or ethylate. The lower alkoxy group is then split, for example, by treatment with hydrochloric acid. These steps may also be combined by treating a 2-halogeno-thiazole with a mixture of the desired alcohol and a strong acid, for example, with methanol or ethanol and hydrochloric acid. An unsubstituted or substituted methylene group in 2-position may be oxidatively degradated to the oxo groups. A substituted methylene group is more especially a dicarbalkoxy-methylene group.

The starting materials used in these processes may also be formed in reactions where conditions apply which convert them into the desired end products according to one of the above-described processes. Thus, as shown in the beginning, a salt of an α-halogeno-ketone may be, for example, reacted with ethyl thiocarbamate, yielding intermediarily a 2-ethoxy-thiazole, which under the conditions of the reaction is converted to the corresponding 4-thiazoline-2-one.

What is claimed is:
1. A member of the group consisting of 3-$R_1$-4-pyridyl-5-$R_2$-4-thiazoline-2-ones, in which each of the radicals $R_1$ and $R_2$ stands for a member of the group consisting of hydrogen and lower alkyl, thereapeutically useful acid addition salts and non-toxic lower alkyl quaternary ammonium salts thereof.
2. 4-pyridyl-4-thiazoline-2-one.
3. 4-(2-pyridyl)-4-thiazoline-2-one.
4. 4-(3-pyridyl)-4-thiazoline-2-one.
5. 4-(4-pyridyl)-4-thiazoline-2-one.
6. 3-lower alkyl-4-pyridyl-4-thiazoline-2-one.
7. 3-methyl-4-(2-pyridyl)-4-thiazoline-2-one.
8. 3-methyl-4-(3-pyridyl)-4-thiazoline-2-one.
9. 3-methyl-4-(4-pyridyl)-4-thiazoline-2-one.
10. In a process for the preparation of a member of the group consisting of 3-$R_1$-4-pyridyl-5-$R_2$-4-thiazoline-2-one, in which each of the radicals $R_1$ and $R_2$ stands for a member of the group consisting of hydrogen and lower alkyl, therapeutically useful acid addition salts and non-toxic lower alkyl quaternary ammonium salts thereof, the step which comprises treating the hydrohalide salt of a pyridyl α-halogeno-$R_2$-methyl ketone with a lower alkyl N-$R_1$-thiocarbamate, in which $R_1$ and $R_2$ have the above given meaning.
11. Process according to claim 10, in which the hydrobromide of a pyridyl α-bromo-methyl ketone is reacted with a lower alkyl thiocarbamate.
12. Process according to claim 10, in which the hydrobromide of a pyridyl α-bromomethyl ketone is reacted with a lower alkyl N-lower alkyl-thiocarbamate.

References Cited in the file of this patent

Walther et al.: Chem. Abst., vol. 1, p. 1990[8] (1907).

UNITED STATES PATENT OFFICE
CERTIFICATE OF CORRECTION

Patent No. 2,910,479 October 27, 1959

George de Stevens

It is hereby certified that error appears in the printed specification of the above numbered patent requiring correction and that the said Letters Patent should read as corrected below.

Column 2, line 18, before "given" insert -- above --; line 55, for "an" read -- any --.

Signed and sealed this 13th day of September 1960.

(SEAL)

Attest:

KARL H. AXLINE
Attesting Officer

ROBERT C. WATSON
Commissioner of Patents